(12) United States Patent
Wang et al.

(10) Patent No.: US 7,760,011 B2
(45) Date of Patent: Jul. 20, 2010

(54) SYSTEM AND METHOD FOR AUTO-POWER GATING SYNTHESIS FOR ACTIVE LEAKAGE REDUCTION

(75) Inventors: Alice Wang, Allen, TX (US); Hugh T. Mair, Fairview, TX (US); Gordon Gammie, Plano, TX (US); Uming Ko, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/947,012

(22) Filed: Nov. 29, 2007

(65) Prior Publication Data

US 2009/0039952 A1 Feb. 12, 2009

Related U.S. Application Data

(60) Provisional application No. 60/955,230, filed on Aug. 10, 2007.

(51) Int. Cl.
G05F 1/10 (2006.01)
G05F 3/02 (2006.01)
(52) U.S. Cl. .................. 327/544; 326/31; 326/33; 326/34
(58) Field of Classification Search ............... 327/544; 326/31, 33, 34
See application file for complete search history.

(56) References Cited

U.S. PATENT DOCUMENTS

| 6,657,467 | B2 | 12/2003 | Seki et al. |
|---|---|---|---|
| 7,061,292 | B2 | 6/2006 | Maksimovic et al. |
| 7,131,089 | B2 | 10/2006 | Issa et al. |
| 7,142,019 | B2 | 11/2006 | Mair et al. |
| 7,148,755 | B2 | 12/2006 | Naffziger et al. |
| 7,436,205 | B2 * | 10/2008 | Tada ...................... 326/33 |

(Continued)

FOREIGN PATENT DOCUMENTS

JP 2007122437 A 5/2007

OTHER PUBLICATIONS

Hattori, T., et al., "A Power Management Scheme Controlling 20 Power Domains for a Single-Chip Mobile Processor," 2006 IEEE International Solid-State Circuits Conference (ISSCC 2006), Session 29: Power Management and Distribution, 2006, 10 pp., No. 29.5, IEEE, Los Alamitos, CA.

(Continued)

*Primary Examiner*—Lincoln Donovan
*Assistant Examiner*—Adam D Houston
(74) *Attorney, Agent, or Firm*—Wade J. Brady, III; Frederick J. Telecky, Jr.

(57) ABSTRACT

A method includes parsing a design of the integrated circuit to define cells in automatic power gating power domains, automatically creating an automatic power gating power domain netlist from the parsed design of the integrated circuit, and placing and routing the automatic power gating power domain netlist to produce a layout for the integrated circuit. The parsing partitions a high-level power domain of the integrated circuit into one or more automatic power gating power domains. The automatic power gating power domains have substantially zero-cycle power up times, thereby enabling transparent operation. Furthermore, the automatic power gating power domains may be automatically inserted into designs of integrated circuits, thereby relieving integrated circuit designers of the task of inserting power domains and associated hardware and software.

6 Claims, 8 Drawing Sheets

U.S. PATENT DOCUMENTS

| | | | |
|---|---|---|---|
| 2005/0194592 | A1 | 9/2005 | Mair et al. |
| 2006/0091385 | A1 | 5/2006 | Mair et al. |
| 2006/0119419 | A1* | 6/2006 | Park et al. .................. 327/536 |
| 2006/0184808 | A1 | 8/2006 | Chua-Eoan et al. |
| 2008/0136507 | A1* | 6/2008 | Kim et al. .................. 327/544 |
| 2008/0204125 | A1* | 8/2008 | Lee et al. .................. 327/544 |
| 2008/0309369 | A1* | 12/2008 | Sakata et al. ................. 326/34 |
| 2009/0072894 | A1* | 3/2009 | Sugimoto .................. 327/544 |
| 2009/0085902 | A1* | 4/2009 | Yamamoto et al. .......... 345/211 |

OTHER PUBLICATIONS

Kanno, Y., et al., "Hierarchical Power Distribution with 20 Power Domains in 90-nm Low-Power Multi-CPU Processor," 2006 IEEE International Solid-State Circuits Conference (ISSCC 2006), Session 29: Power Management and Distribution, 2006, 10 pp., No. 29.4, IEEE, Los Alamitos, CA.

"The Proven Path to Success," TSMC 2007 Technology Symposium, pp. 1-192, Taiwan Semiconductor Manufacturing Company, Ltd., Hsin-Chu, Taiwan, R.O.C.

* cited by examiner

SYSTEM AND METHOD FOR AUTO-POWER GATING SYNTHESIS FOR ACTIVE LEAKAGE REDUCTION

This application claims the benefit of U.S. Provisional Application No. 60/955,230, filed on Aug. 10, 2007, entitled "Auto-Power Gating Synthesis For Active Leakage Reduction," which application is hereby incorporated herein by reference.

TECHNICAL FIELD

The present invention relates generally to a system and method for integrated circuits, and more particularly to a system and method for automatic power gating synthesis to reduce active leakage current.

BACKGROUND

As electronic devices continue to become more feature rich, the extra functionality typically requires the addition of circuitry to the electronic devices. The additional circuitry being added to the electronic devices usually takes the form of integrated circuits, be it in the form of extra integrated circuits or revisions of existing integrated circuits with more functional parts. While integrated circuits typically offer enhanced reliability and lower power consumption over discrete components, the addition of extra integrated circuits usually means that the electronic devices will incur an increase in power consumption. Increased power consumption may be undesirable, especially for wireless electronic devices, wherein the increased power consumption may shorten the operating time between charges of a battery providing power to a wireless electronic device.

In an electronic device with a wide array of features, it may be atypical for more than a few of the features to be in use at any given time. For example, in a smart communications device containing a cellular telephone, a web browser, a personal digital assistant, a pager, a multimedia player, a navigation device, and so forth, the use of a single feature often precludes the use of many of the remaining features. For example, when a user is speaking on the cellular telephone, it is unlikely that the multimedia player will also be in active use. Therefore, power may be eliminated from integrated circuitry implementing the features not in use to help reduce power consumption.

A prior art technique commonly used to help reduce power consumption involves the partitioning of an integrated circuit(s) into power domains. When a circuit in a power domain is needed, then all circuitry in the power domain is powered. If no circuitry in a power domain is needed, then none of the circuitry in the power domain is powered. Enhancements to the technique have added hierarchical power domain trees to increase control over which circuits to turn on and which to turn off, while other enhancements have helped to resolve signal routing problems and power rail stability.

However, a disadvantage of prior art techniques is that they often ignore circuitry that may perform many different functions, which may make it difficult to determine which portions of the circuit to turn on or turn off. Therefore, a significant portion of circuitry in an electronic device may not have power consumption control.

Another disadvantage of prior art techniques is that they may negatively impact the performance of the circuitry in the electronic device. Software is commonly used to control the state of the various power domains. Since software may be slow in shutting down or powering up a power domain, the state of circuitry within a power domain may need to be known prior to when the circuitry actually needs to be shut down or powered up.

Yet another disadvantage of prior art techniques is that the power control hardware and software is typically added by designers of the electronic device, which may significantly complicate the design and development process.

SUMMARY OF THE INVENTION

These and other problems are generally solved or circumvented, and technical advantages are generally achieved, by embodiments of a system and a method for automatic power gating synthesis to reduce active leakage current.

In accordance with an embodiment, a method for designing an integrated circuit is provided. The method includes parsing a design of the integrated circuit to define cells in automatic power gating power domains, automatically creating an automatic power gating power domain netlist from the parsed design of the integrated circuit, and placing and routing the automatic power gating power domain netlist to produce a layout for the integrated circuit. The parsing includes partitioning a high-level power domain of the integrated circuit into one or more automatic power gating power domains, with each automatic power gating power domain containing a subset of cells contained in the high-level power domain.

In accordance with another embodiment, a switch for a power domain containing a plurality of fine grained power regions is provided. The switch includes a plurality of distributed switches arranged in parallel, each distributed switch having a first terminal coupled to a first power rail and a second terminal coupled to a fine grain power region, and a plurality of logic units, each logic unit having an output coupled to a control terminal of a distributed switch and a first input coupled to a central control signal line common to all logic units and a second input to a distributed control signal line unique for each logic unit, each logic unit to logically combine the control signals at its first input and second input into a control signal for the distributed switch. Each distributed switch controls a current path through the fine grain power region.

In accordance with another embodiment, an integrated circuit is provided. The integrated circuit includes a hard macro unit that provides a function, the hard macro unit including a power domain, and a top level power domain unit configured to provide fine grained functionality. The top level power domain unit includes an automatic power gating power domain, a switch having a first terminal coupled to a first power rail and a second terminal coupled to the automatic power gating power domain, and a logic unit having an output coupled to a control terminal of the switch and a first input coupled to a common switch control signal line and a second input to a distributed control signal line unique to the logic unit. The automatic power gating power domain contains circuit cells to provide a single function or a number of functions, the switch to control a current path through the automatic power gating power domain, and the logic unit to logically combine the control signals at its first input and second input into a control signal for the switch.

An advantage of an embodiment is that the addition of the hardware needed to provide power control may be added automatically to a design of a circuit. Therefore, the designers of the circuit need not include the power control hardware into the design of the circuit. This may simplify the circuit design and development process.

Another advantage of an embodiment is that the power control may be achieved at a fine grained level, potentially allowing a larger number of circuits may be powered down to help reduce power consumption when the circuits are not being used.

A further advantage of an embodiment is that the power control hardware may operate quickly. Therefore, the shutting down and powering up of power domains may not negatively impact the performance of the electronic device since the electronic device may not need to wait for a sleeping power domain to be powered up or a powered power domain to be powered down. The electronic device may operate in a normal manner with the power control operating transparently in the background.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely an integrated circuit containing multiple power domains and a single top level power domain. The invention may also be applied, however, to other integrated circuits containing multiple power domains and multiple top level power domains. Additionally, the invention may also be applied to multiple integrated circuits packaged together, such as in a multi-chip module, a system on a chip, and so forth, into a single electronic device.

Figure 1:
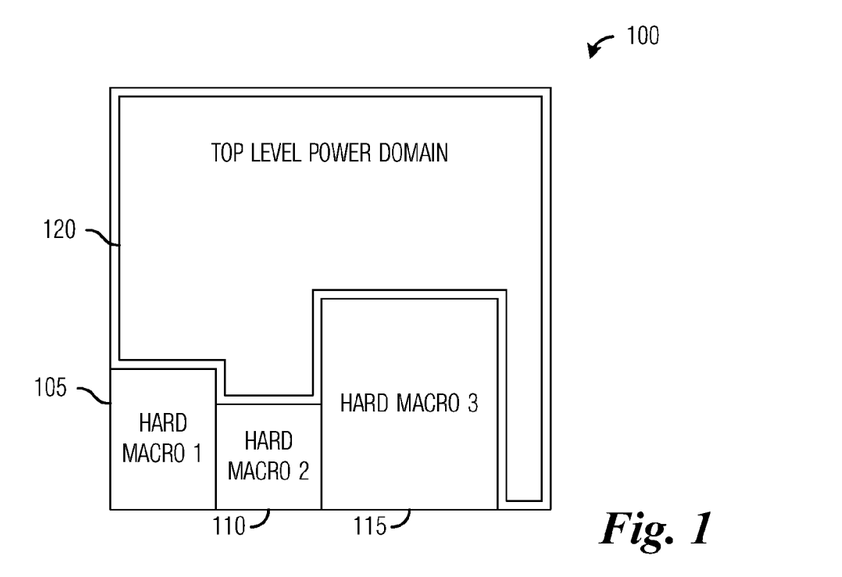
FIG. 1 is a diagram of an integrated circuit.

With reference now to FIG. 1, there is shown a diagram illustrating an integrated circuit 100. The integrated circuit 100 includes several hard macros, such as hard macro 1 105, hard macro 2 110, and hard macro 3 115. Hard macros may be functional units that are predesigned and added to the integrated circuit 100 to provide desired functionality. Examples of hard macros may be processing elements, application specific integrated circuits, signal processors, radio circuits, filters, and so forth. The hard macros may be purchased from other vendors or may be designed by different development teams and then added to the integrated circuit 100 using computer aided design tools. The hard macros may have their own power control hardware and/or software and may require modification to the power control hardware/software to ensure interoperability.

The integrated circuit 100 also includes a top level power domain 120. The top level power domain 120 may include circuitry that may be used to enable interoperability between the hard macros contained in the integrated circuit 100. The top level power domain 120 may also include functional blocks designed by various development teams that may be too fine grained (i.e., small) to warrant an individual power domain. Furthermore, the top level power domain 120 may include circuits and/or functional blocks whose power requirements may not be readily predicted by software and/or hardware and therefore may not be viable candidates for power control systems that may not be able to afford transparent power control. Additionally, the top level power domain 120 may be a single power domain, therefore, power control for the top level power domain 120 may be limited.

Depending on the integrated circuit 100, the top level power domain 120 may be a small percentage of the overall integrated circuit 100 or a large percentage of the overall integrated circuit 100. If the top level power domain 120 makes up a large percentage of the integrated circuit 100, then a considerable amount of the power consumed by the integrated circuit 100 may be due to the top level power domain 120.

Figure 2A:
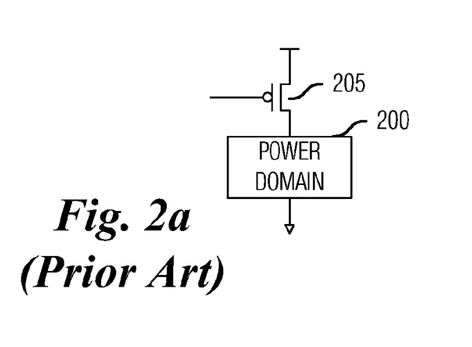
FIGS. 2a and 2b are diagrams of switches for controlling power domain state.
Figure 2B:
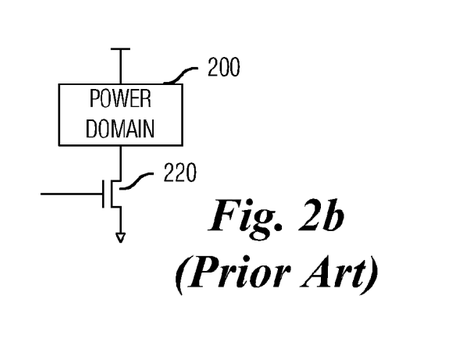

FIG. 2a illustrates a prior art configuration for controlling power to a power domain 200. The power for the power domain 200 may be controlled by a switch 205. The switch 205 lies between a first power rail, for example, VDD, and the power domain 200. The power domain 200 may be coupled to a second power rail, for example, substrate ground. Depending on a state of its control terminal, the switch 205 may be closed or open. When closed, the switch 205 provides a current path through the power domain 200 connecting the first power rail and the second power rail. The switch 205 may be referred to as a header switch. The switch 205 should be large to provide adequate current to satisfy the needs of the power domain 200, therefore, the switch 205 may be slow to switch between being open to being closed and vice versa. FIG. 2b illustrates an alternate prior art configuration with a switch 220 positioned between the power domain 200 and the second power rail. The switch 220 may be referred to as a footer switch.

Figure 3A:
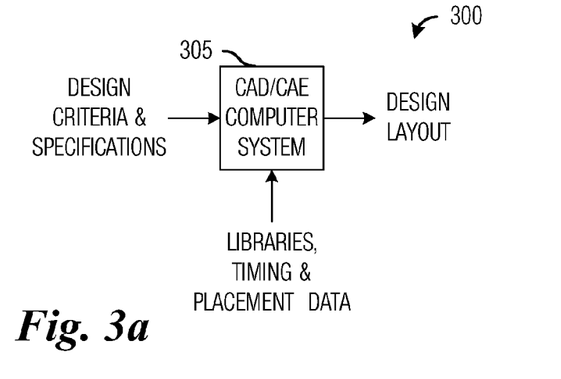
FIG. 3a is a high-level diagram of a system for designing integrated circuits.

FIG. 3a illustrates a system 300 for designing integrated circuits. The system 300 includes a computer aided design (CAD)/computer aided engineering (CAE) computer system 305 that may include one or more processing elements. The CAD/CAE computer system 305 may have as input a set of design criteria and specifications that may provide a description of a design to be created. Additionally, the CAD/CAE computer system 305 may also have as input, libraries, timing and placement data, and other technical information related to a technology and manufacturing process used in the creation of the design. For example, the libraries, timing and placement data, as well as other technical information may describe performance properties and characteristics, physical requirements and limitations, design rules and restrictions, among other information pertaining to manufacturing process technologies used to create the design. The CAD/CAE computer system 305 may combine the technical information along with designer interaction and input to produce a design layout that may be used to fabricate the design. The system 300 may be a complete design and development system that includes design verification and simulation or the design layout may be provided to another system for verification and simulation purposes.

Figure 3B:
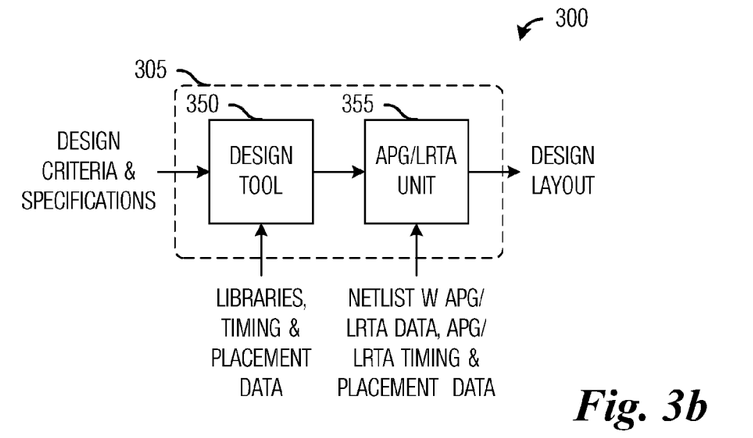
FIG. 3b is a diagram of a detailed view of a system for designing integrated circuits.

FIG. 3b illustrates a detailed view of the system 300 for designing integrated circuits, with emphasis given to the CAD/CAE computer system 305. The CAD/CAE computer system 305 includes a design tool 350 that may be used to create a design for an integrated circuit and an automatic power-gating (APG)/logical retention 'til access (LRTA) unit 355 that may be used to insert design transparent power control hardware into the design for the integrated circuit. The APG/LRTA unit 355 may insert power control hardware with power domains that are fine grained at a sub-functional unit or operational level, i.e., smaller than functional units or circuit blocks. Additionally, the power domains may be larger in size than individual cells so that area and leakage current overhead may be minimized.

The APG/LRTA unit 355 may make use of asynchronous control with enable/disable gating so that clock gate and control signals may trigger appropriate gating signals and power up/down sequences. This may enable zero or substantially zero latency operation and does not require clock synchronization.

The APG/LRTA unit 355 may insert power control hardware into circuits (APG domains) during physical design. The modified circuits may be functionally equivalent with no register transfer level (RTL) or software (SW) impact. The power control hardware may be logically equivalent to a buffer and may be inserted into the circuits at a gate or netlist level for each APG domain. The power control hardware inserted into circuits may further enable use-case and timing analysis as well as logic optimization and critical path evaluation and elimination.

The APG/LRTA unit 355 may modify the APG domains so that they may be optimized for single cycle enable and power up. Optionally, other speeds may be enabled, such as half speed, third speed, quarter speed, and so forth. The APG/LRTA unit 355 may make use of techniques such as timing analysis, power enable time reduction, power switch chain parallelism, logic optimization and critical path elimination, as well as power domain size control. Power domain size control may enable better performance since smaller power domains enable faster restart and maximize power reduction, in general. In general, a typical size for an APG power domain may be on the order of 10 k to 100 k gates versus 100 k to 2M gates for typical power domains, or one to two orders of magnitude fewer gates.

Figure 3C:
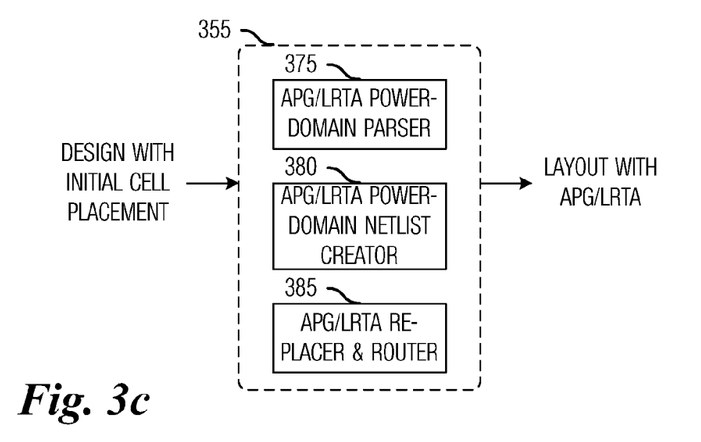
FIG. 3c is a diagram of a detailed view of an APG/LRTA unit.

FIG. 3c illustrates a detailed view of the APG/LRTA unit 355. The APG/LRTA unit 355 includes an APG/LRTA power domain parser unit 375, an APG/LRTA power domain netlist creator 380, and an APG/LRTA re-placer and router 385. The APG/LRTA power domain parser unit 375 may have as input a completed design for the integrated circuit from the design tool 350 in netlist form, wherein the completed design may contain one or more power domains, but may not contain any APG power domains. The APG/LRTA power domain parser unit 375 may then analyze the netlist of the completed design for the integrated circuit to create APG power domains in a top level power domain present in the completed design for the integrated circuit. The APG/LRTA power domain parser unit 375 may make use of a netlist of the completed design for the integrated circuit as well as timing and placement files and libraries pertaining to the design of the integrated circuit and manufacturing processes and technologies utilized in the integrated circuit. The APG/LRTA power domain parser unit 375 may produce as output a list of cells in the completed design for the integrated circuit that are in each APG power domain.

The APG/LRTA power domain netlist creator 380 may then create a hierarchical netlist from the APG power domains created by the APG/LRTA power domain parser unit 375. The use of a hierarchical arrangement for the APG power domains may allow for greater power control of the individual APG power domains when compared to a non-hierarchical arrangement. The hierarchical netlist from the APG/LRTA power domain netlist creator 380 may then be provided to the APG/LRTA re-placer and router 385 for cell placement and trace routing. Output of the APG/LRTA re-placer and router 385 may be a complete design (layout) for the integrated circuit with APG/LRTA power control and may be ready for fabrication or simulation.

Figure 4:
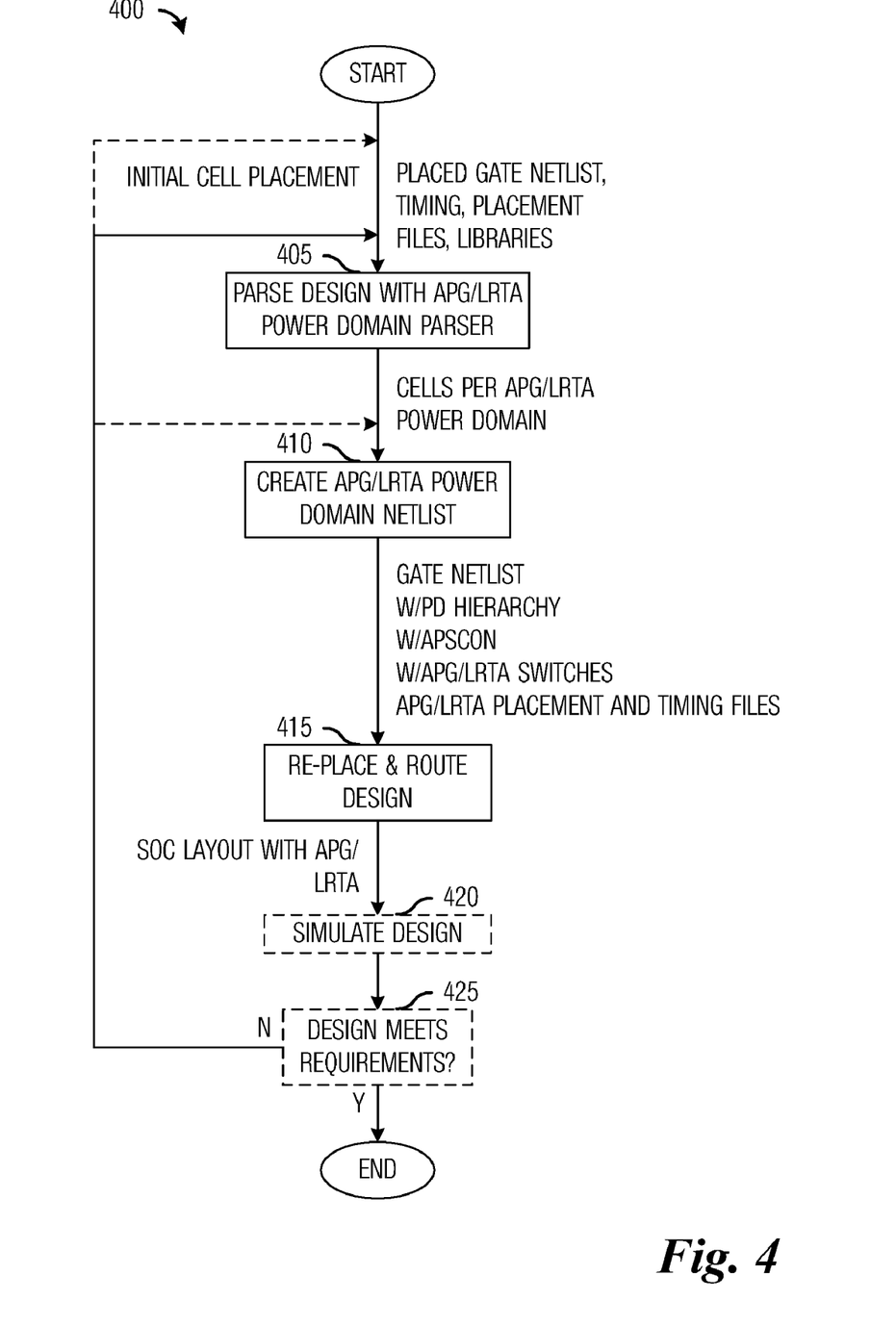
FIG. 4 is a diagram of a sequence of events in the insertion of APG power domains in a design of an integrated circuit.

FIG. 4 illustrates a sequence of events 400 in the insertion of APG power domains in a design of an integrated circuit. The sequence of events 400 may begin after an initial design of the integrated circuit has been completed. The initial design may include simulation studies to verify the correct operation of the integrated circuit or the initial design may be an unsimulated design that includes circuit elements that have been placed. The insertion of APG power domains may begin with a parsing of the initial design with an APG/LRTA power domain parser (block 405). The APG/LRTA power domain parser may parse the initial design and determine which cells or parts of the initial design may be grouped together into APG power domains. The APG/LRTA power domain parser may create a list of cells of the initial design for each APG power domain. The APG power domains may be applied to top-level core logic as well as synchronous RAM periphery logic. Furthermore, the APG power domains may be utilized in the hard macro regions, such as hard macro 1 105, and so forth.

The parsing performed by the APG/LRTA power domain parser may follow several different approaches when creating the list of cells for the APG power domains. For example, the APG power domains may be grouped by functionality, wherein cells that have similar functionality or operate in close synchrony with one another may be placed in an APG power domain. Alternatively, the APG power domains may be grouped simply by proximity or distance, wherein cells that are close together may be placed in an APG power domain. In yet another alternative, cells that, when grouped by functionality, are physically clustered together or are in relatively close proximity, may be placed in an APG power domain. Placing cells that have similar functionality that are also close together in proximity may simplify the placement and routing of the cells and their associated APG power domains.

After parsing the initial design with the APG/LRTA power domain parser, an APG/LRTA power domain netlist may be created (block 410). In addition to the parsed design from the APG/LRTA power domain parser, the creation of the APG/LRTA power domain netlist may make use of the initial design of the integrated circuit. The APG/LRTA power domain netlist may include a complete netlist of the initial design along with the APG power domains and associated hardware, such as power domain hierarchy, power switch control, switches, signal buffers, signal trees to control switches, a combiner to logically generate a control signal from several input control signals, APG/LRTA placement and timing files, and so forth. The APG/LRTA power domain netlist may then be used to re-place and route the integrated circuit, producing a layout of the design (block 415). The re-placing and routing of the integrated circuit may produce a complete layout with APG power domains. After the re-place and route, the design may optionally be simulated to verify function (block 420). If the design is simulated to verify function, a check may be made to determine if the design meets performance requirements (block 425). If the design does not meet performance requirement, the design may be modified by returning to block 405 to reparse the initial design to determine APG power domain groupings. Alternatively, the modification of the design may include the creation of a new APG/LRTA power domain netlist in block 410. The modification of the design may even include a redesign of the initial design.

Figure 5A:
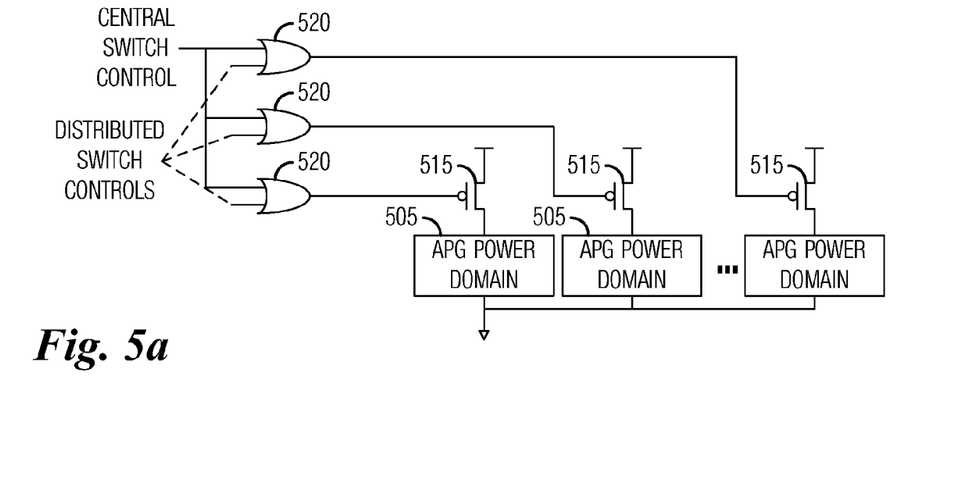
FIGS. 5a through 5d are diagrams of switches for controlling APG power domain state.

The fine grain power control provided in APG power domains may be afforded through the use of a dual switch configuration. FIG. 5a illustrates a power domain, such as the top level power domain 120 that includes several APG power domains 505. The APG power domains 505 may be collective coupled to a first power rail by a distributed switch 515. The distributed switch 515 may control power to each APG power domains 505. As shown in FIG. 5a, the distributed switches 515 are arranged in a header configuration, coupling the APG power domains 505 to VDD. The distributed switches 515 may be sized to meet the current requirements of the APG power domains 505. Although the discussion focuses on the partitioning of the top level power domain 120 into APG power domains, it may be possible to partition hard macros, such as hard macro 1 105, hard macro 2 110, hard macro 3 115, into APG power domains. Therefore, the discussion of the partitioning of the top level power domain 120 should not be construed as being limiting to either the spirit or the scope of the present invention.

The distributed switches 515 may be controlled via a centralized control or a distributed control or both. When centrally controlled, a central switch control signal may control the state of all of the distributed switches 515 coupled to a central switch control signal line. For example, if the central switch control signal is in an active on state, then all of the distributed switches 515 may be on, while if the central switch control signal is in an active off state, then all of the distributed switches 515 may be off.

When the distributed switches 515 are under distributed control, each distributed switch 515 may have its state controlled by a separate distributed switch control signal. Therefore, depending on the value on each of the distributed switch control signals, individual distributed switches 515 may be on or off. Each distributed switch 515 may have its own individual distributed switch control signal or alternatively, a single distributed switch control signal may be delayed by a delay corresponding to an individual distributed switch 515, undergo a logical operation, or so on, prior to being provided to a control terminal of a distributed switch 515.

A plurality of logic units 520 with each logic unit 520 coupled to a distributed switch 515 may be used to control the state of the corresponding distributed switch 515. The logic unit 520 may have a first input coupled to the central switch control signal and a second input coupled to a distributed switch control signal associated with the distributed switch 515 coupled to the logic unit 520. The logic unit 520 may then combine the two control signals and apply the combined control signal to the distributed switch 515. For example, in a simple two control signal system, the logic unit 520 may be implemented using a simple logical OR gate. Using a logical OR gate and if logical ONE on either of the control signal lines represents an active ON state, then both control signal lines will need to be in the active ON state for the distributed switches 515 to be ON.

Figure 5B:
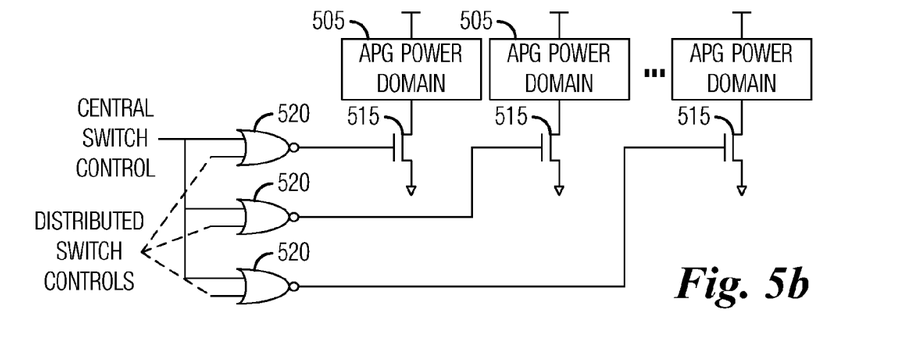

Although shown with the distributed switches 515 in a header configuration, other configurations are possible. For example, the distributed switches 515 may be arranged in a footer configuration, as shown in FIG. 5b. With the distributed switches in a footer configuration, the logic units 520 may be implemented as a simple logical NOR gate.

Figure 5C:
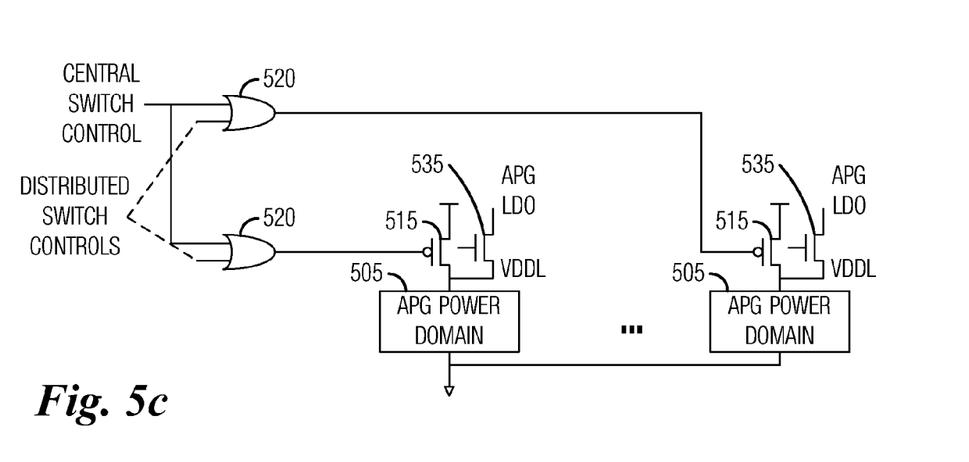
Figure 5D:
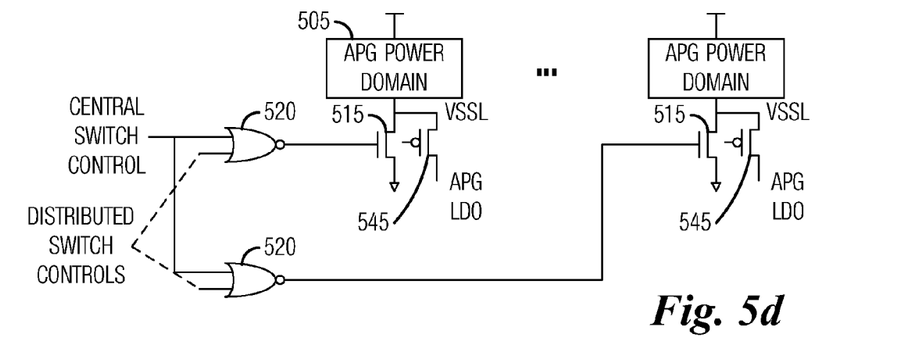

The distributed switches 515 may be coupled to a power rail, such as VDD or VSS, and when turned on, the distributed switches 515 may pull the APG power domains 505 to the power rail. FIG. 5c illustrates an alternative header configuration design that may result in the APG power domains 505 being pulled to a stable voltage level that may be at a higher (or lower depending on configuration) voltage potential than the power rail. An advantage of pulling the APG power domains 505 to a stable voltage level that is at a higher (or lower depending on configuration) potential is that standard circuitry may be used without having retention of data concerns. A low dropout regulator (LDO) may be used in conjunction with an LDO switch 535 so that when the distributed switches 515 are closed, the APG power domains 505 are pulled to a voltage potential that is at a lower potential than the power rail, VDDL as opposed to VDD. The LDO switch 535 may be controlled by its own control signal or the LDO switch 535 may be configured as a diode connected transistor, for example. FIG. 5d illustrates an alternative footer configuration design, with a LDO switch 545 arranged so that the APG power domains 505 are pulled to a voltage potential that is at a higher potential than the power rail, VSSL as opposed to VSS.

The distributed switches 515 may be turned on or turned off by a control signal at their control terminal, for example, a gate terminal for NMOS and PMOS implementations of the distributed switches 515. As discussed previously, the control signal used to turn on or off the distributed switches 515 may be a combination of a central switch control signal and a distributed switch control signal. The control signals used to control the distributed switches 515 may be signals already present in the original design for the integrated circuit or a logical combination of signals already present.

Figure 6A:
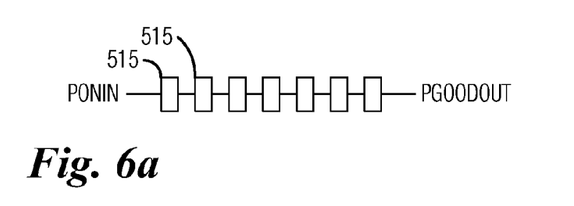
FIGS. 6a and 6b are diagrams of arrangements for providing a control signal for controlling distributed switch state to distributed switches.
Figure 6B:
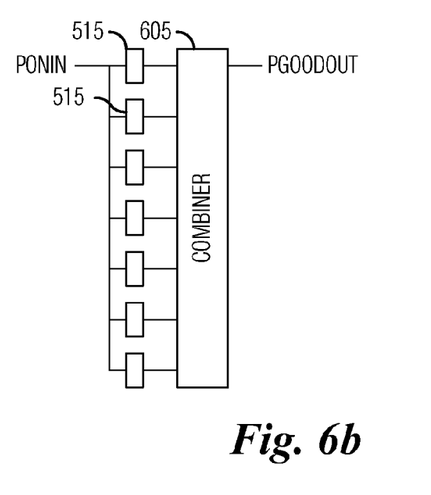

The control signal (e.g., PONIN) may be serially connected, such as shown in FIG. 6a. Logically, the control signal (PONIN) may equate to a signal buffer. Advantages of a serially connected control signal may be small area overhead. Alternatively, the control signal (PONIN) may be coupled to each of the distributed switches 515 in parallel, as shown in FIG. 6b. An advantage of a parallel configuration may be fast power up. However, the control signal to each of the distributed switches 515 may need to be provided to a combiner 605. The combiner 605 may be used to generate a second control signal (e.g., PGOODOUT) from the control signal provided to each of the distributed switches 515. If the number of distributed switches 515 is large, then the combiner 605 may be large and may require a significant amount of integrated circuit real-estate. In addition to being serially connected (as shown in FIG. 6a) or arranged in parallel (as shown in FIG. 6b), the control signal (PONIN) may be arranged in a combination of both serial and parallel to meet power up and integrated circuit real-estate requirements.

Figure 7A:
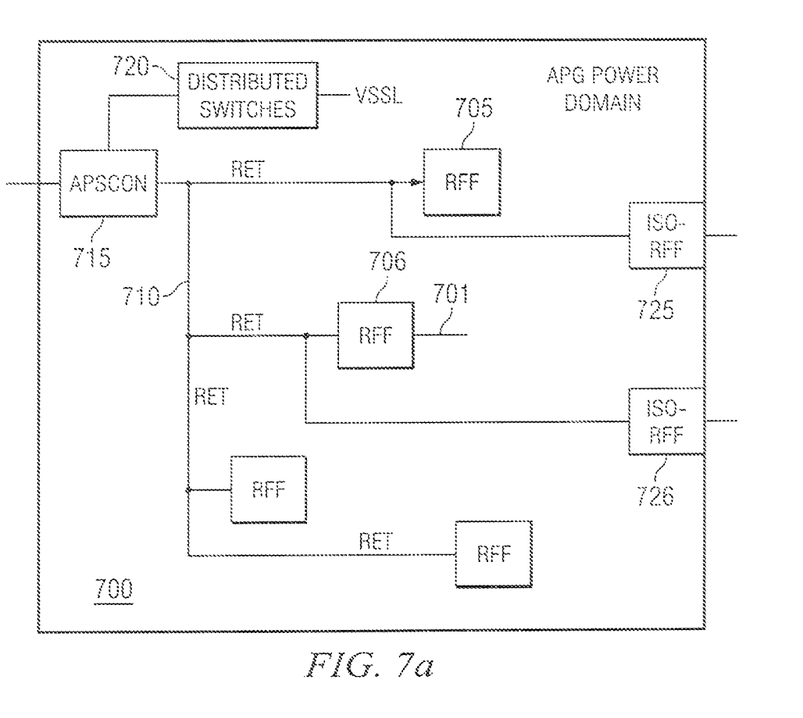
FIGS. 7a and 7b are diagrams of APG power domains.

FIG. 7a illustrates a high-level view of an APG power domain 700. The high-level view of the APG power domain 700 illustrates only power control circuitry and signals. Functional cells within the APG power domain 700 are not displayed to maintain simplicity of the figure. The APG power domain 700 may include retention flip flops (RFF), such as RFF 705 and RFF 706, which may be used to store signal values of functional cells within the APG power domain 700. The signal values may be supplied by an internal signal line 701, for example. The RFFs may be controlled by a control signal "RET" on a control signal line 710 that may be provided by an asynchronous power switch control (APSCON) unit 715.

The APSCON unit 715 may produce control signals based on one or more trigger signals. Exemplary trigger signals may include a sleep/enable signal, a clock gate/enable signal, a retention/enable signal, a power down/enable signal, and so forth. Based on the value of the trigger signal(s), the APSCON unit 715 may compute a value to assert on control signals, such as the control signal "RET." For example, when the control signal "RET" becomes active true, then the RFFs may retain (or capture) a value at their respective inputs.

The APSCON unit 715 may operate in an asynchronous fashion, meaning that the APSCON unit 715 does not require synchronization with a timing clock to operate. Therefore, the APSCON unit 715 may operate with substantially zero cycle latency, changing state as rapidly as inputs to the APSCON unit 715 changes. Due to the asynchronous operation of the APSCON unit 715, the APG power domain 700 may be able to power up or get out of retention mode within a single clock cycle. The APSCON unit's asynchronous operation may also be advantageous since a clock signal may likely be gated to a power domain containing the APG power domain 700 and not the APG power domain 700 itself. Output from the APSCON unit 715 may include the control signal "RET" as well as a control signal for controlling switch states of distributed switches in a bank of distributed switches 720 in the APG power domain 700.

The APG power domain 700 may also include isolation retention flip flops (ISO-RFF), such as ISO-RFF 725 and ISO-RFF 726. The ISO-RFFs 725 and 726 may be used to retain signal values of signal lines that cross a boundary of the APG power domain 700 (e.g., APG power domain outputs). For example, a signal line that leaves the APG power domain 700 and enters another APG power domain may need to have its signal value retained in an ISO-RFF while the APG power domain 700 is powered down to ensure that the signal line is not left in a floating state, which may lead to inconsistent and undesired operation. The use of the ISO-RFFs only at APG boundaries may also help to minimize leakage current as well as reduce area overhead.

The signal lines crossing the boundary of the APG power domain 700 are registered to preserve their values. However, the ISO-RFFs 725 and 726 may be used to preserve the values of the signal lines and not logical combinations of the signal lines. Preferably, the ISO-RFFs 725 and 726 make use of CMOS voltage levels (or voltage levels corresponding to process technologies used in the fabrication of the integrated circuit). While RFFs 705 and 706 may not necessarily make use of CMOS voltage levels.

Figure 7B:
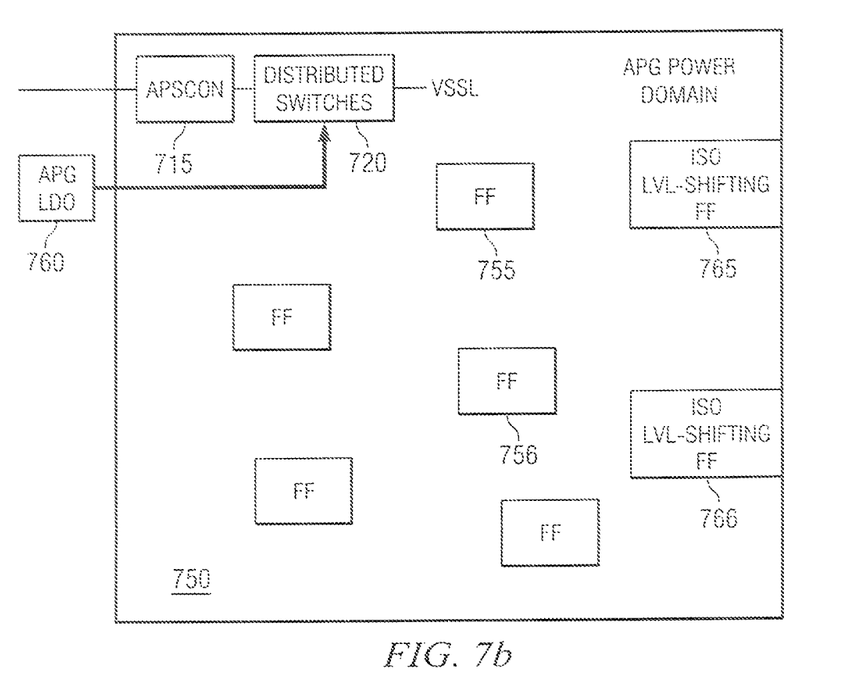

FIG. 7b illustrates a high-level view of an APG power domain 750. The APG power domain 750 may be an alternative embodiment of an APG power domain. Different from the APG power domain 700, the APG power domain 750 makes use of standard flip flops (FF), such as FF 755 and FF 756, to store signal values of functional cells with the APG power domain 750. As with the APG power domain 700, the APG power domain 750 includes an APSCON unit 715 to provide substantially zero cycle latency in the control of switch state of distributed switches in a bank of distributed switches 720.

The APG power domain 750 may also receive a control signal from an APG low-dropout regulator (APG-LDO) 760. The APG-LDO 760 may be used to generate a stable voltage for retention purposes. As shown in FIG. 7a, a power rail (VDD) may be allowed to float to voltage ground. However, in FIG. 7b, VDD may be held at a stable voltage that may be generated by the APG-LDO 760, thereby allowing the use of standard flip flops capable of retaining low voltage values.

The APG power domain 750 may include isolation level shifting flip flops (ISO LVL-SHIFTING FF), such as ISO LVL-SHIFTING FF 765 and ISO LVL-SHIFTING FF 766, to retain signal values of signal lines that cross a boundary of the APG power domain 750. For example, a signal line that leaves the APG power domain 750 and enters another APG power domain may need to have its signal value retained in an ISO LVL-SHIFTING FF while the APG power domain 750 is powered down to ensure that the signal line is not left in a state that is less than VDD, which may lead to inconsistent and undesired operation. The use of the ISO LVL-SHIFTING FFs only at APG boundaries may also help to minimize leakage current as well as reduce area overhead.

Figure 8:
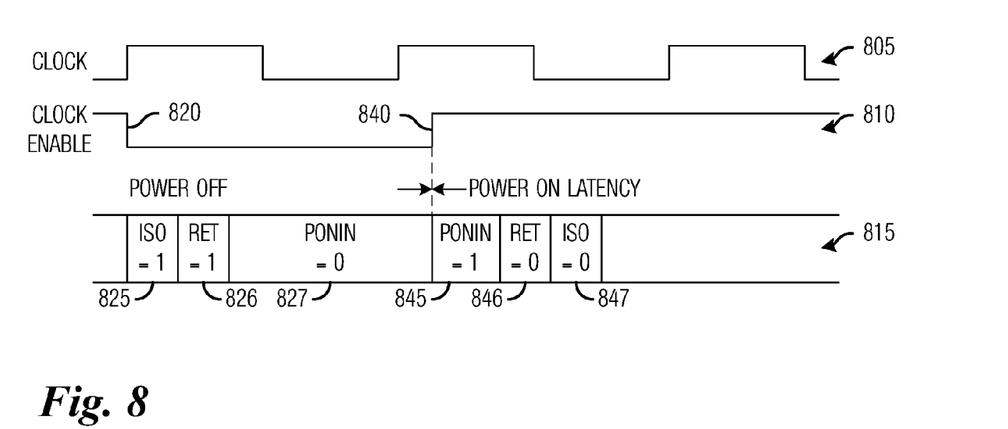
FIG. 8 is a timing diagram of the operation of an APSCON unit.

FIG. 8 illustrates a timing diagram displaying the operation of the APSCON unit 715. A first trace 805 displays a clock signal for a power domain containing an APG power domain, such as the top level power domain 120. A second trace 810 displays a clock enable signal, wherein the clock enable signal may be active high. A third trace 815 displays control signal state for control signals including an isolation signal "ISO," retention "RET," and power on in "PONIN." The control signals may all be output of the APSCON unit 815.

When the clock enable signal changes from enable to disable, shown in the second trace 810 as falling edge 820, the APSCON unit 715 may substantially immediately change the states of the control signals ISO, RET, and PONIN to states corresponding to a disabled clock enable signal. The ISO control signal may change to a true value (block 825) to enable the ISO-RFFs, the RET control signal may change to a true value (block 826) to enable the RFFs, while the PONIN control signal may change to a false value (block 827) to turn off distributed switches in the APG power domain. The scale and timing of the control signal states shown in the third trace 815 may not be an accurate representation of the amount of time required for the APSCON unit 715 to change the state of the control signals after the falling edge 820. Therefore, the relative relationships of the control signal states should not be construed as being limiting to either the scope or the spirit of the present invention.

Then, as the clock enable signal changes from disable to enable, shown in the second trace 810 as rising edge 840, the APSCON unit 715 may substantially immediately change the states of the control signals ISO, RET, and PONIN to states corresponding to an enabled clock enable signal. The PONIN control signal changes back to a true value (block 845) to turn on distributed switches in the APG power domain, while the RET control signal changes back to a false value (block 846)

and the ISO control signal changes back to a false value (block 847) to disable the ISO-RFFs and RFFs, respectively.

Figure 9A:
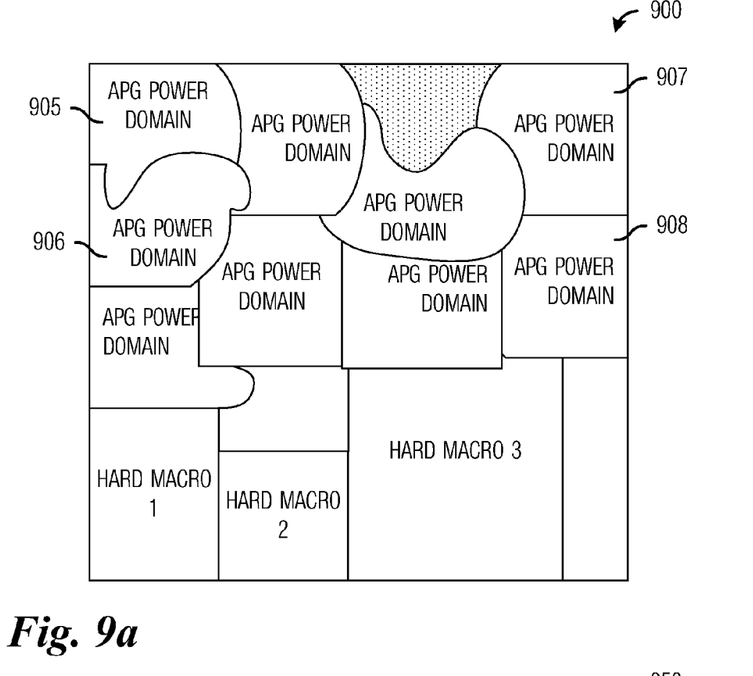
FIGS. 9a and 9b are diagrams of configurations of APG power domains.

Individual APG power domains may have arbitrary size and shape or there may be restrictions on the size and shape on APG power domains. FIG. 9*a* illustrates an integrated circuit 900 containing a number of APG power domains, such as APG power domains 905-908. The APG power domains may be arbitrarily sized and shaped. Being arbitrarily sized and shaped may enable an optimization of the area used by the APG power domains as well as an optimization of the performance of the APG power domains. For example, the arbitrary size and shapes may enable a closer placement of the APG power domains, which may reduce an overall size of the integrated circuit 900 since less unused space may remain on the integrated circuit 900.

Figure 9B:
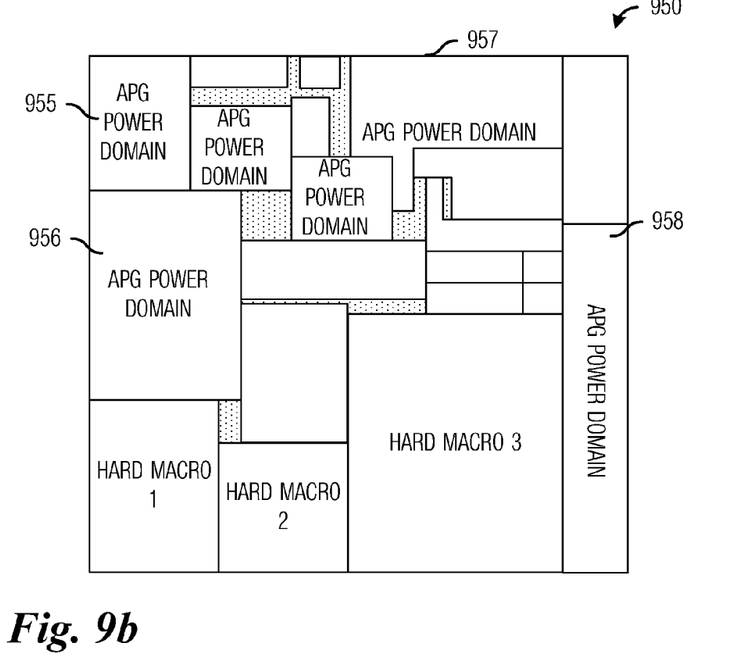

FIG. 9*b* illustrates an integrated circuit 950 containing a number of APG power domains, such as APG power domains 955-958. The APG power domains may have arbitrary size, but there may be restrictions on the shapes of the APG power domains. For example, the power domains 955-958 shown in FIG. 9*b* may be restricted to having square corners or the power domains 955-958 may be restricted to having rectangular shapes. The corner/shape restrictions may result in an increase in an overall size of the integrated circuit 900 since there may be wasted space between adjacent APG power domains. However, the use of regular shapes may simplify circuit design, signal routing, cell placement, and so forth.

Figure 10:
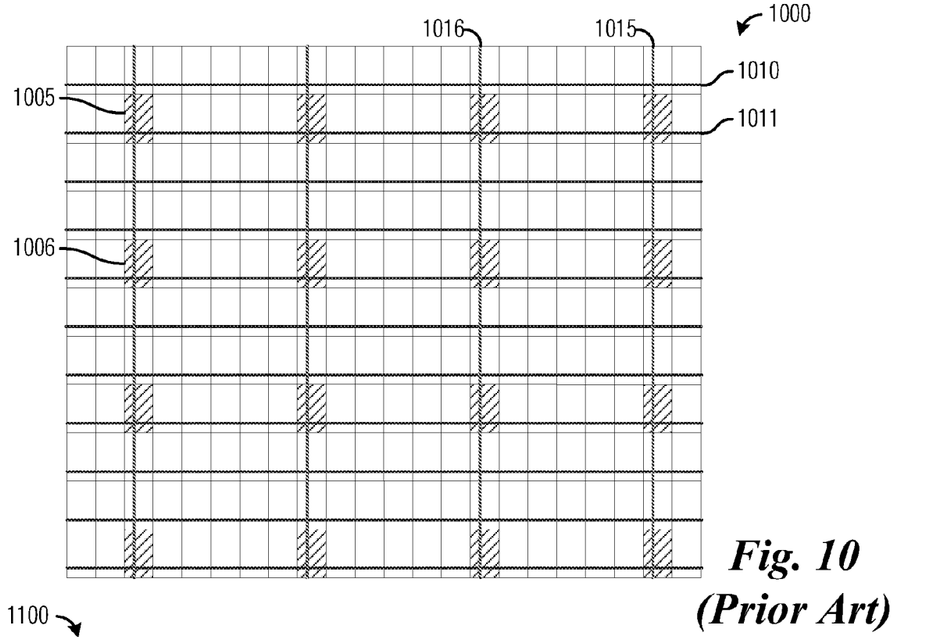
FIG. 10 is a diagram of a prior art power grid.

FIG. 10 illustrates a prior art power grid 1000 for providing power to various APG power domains and other power domains in an integrated circuit. The power grid 1000 includes distributed switches, such as distributed switches 1005 and 1006 located at a variety of locations throughout the power grid 1000. The power grid 1000 also includes horizontal conductors, such as conductor 1010 and 1011 fabricated in a first metal layer and vertical conductors, such as conductor 1015 and 1016 fabricated in a second metal layer. The power grid 1000 may be readily scaled by adding and/or removing distributed switches on an as needed basis.

Figure 11:
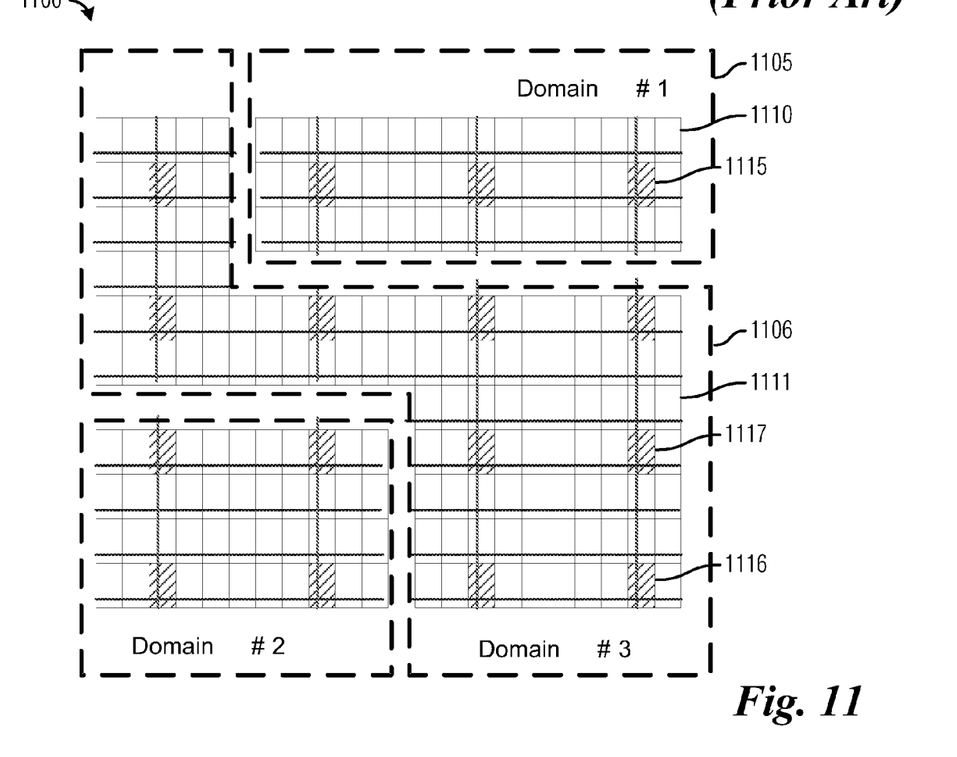
FIG. 11 is a diagram of a partitioned power grid.

FIG. 11 illustrates a power grid 1100 for providing power to various APG power domains and other power domains in an integrated circuit. The integrated circuit may contain several APG power domains, such APG power domain 1105 and 1106. The power grid 1100 may be partitioned into a number of independent power grids, such as independent power grid 1110 and 1111, for use in providing power to separate APG power domains and other power domains in the integrated circuit. The power grid 1100 may be partitioned into independent power grids not routing (or severing) horizontal and vertical conductors, such as the horizontal conductors 1010 and 1011 and vertical conductors 1015 and 1016 shown in FIG. 10.

For example, cells in the APG power domain 1105 may be powered by the independent power grid 1110, which may contain distributed switches, such as distributed switch 1115. Similarly, cells in APG power domain 1106 may be powered by the independent power grid 1111, which may include distributed switches 1116 and 1117. The independent power grids may contain a number of distributed switches that may be proportional to the number of gates in the APG power domain, for example.

In addition to providing power for the APG power domains, the independent power grids, such as independent power grid 1110 and 1111, may be used in body bias switching as well. Body bias switching may involve changing the electric potential of an N well of an NMOS transistor to a higher electric potential to reduce leakage current, for example. Body bias switching is explained in further detail in co-assigned patent application entitled "Adaptive Voltage Control and Body Bias for Performance an Energy Optimization," filed Aug. 26, 2005, application Ser. No. 11/213,477, which patent application is hereby incorporated by reference herein.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An integrated circuit comprising:
    a hard macro unit configured to provide a function, the hard macro unit comprising a power domain; and
    a top level power domain unit configured to provide fine grained functionality, the top level power domain unit comprising,
        an automatic power gating power domain, the automatic power gating power domain containing circuit cells to provide a single function or a number of functions,
        a switch having a first terminal coupled to a first power rail and a second terminal coupled to the automatic power gating power domain, the switch to control a current path through the automatic power gating power domain, and
        a logic unit having an output coupled to a control terminal of the switch and a first input coupled to a common switch control signal line and a second input to a distributed control signal line unique to the logic unit, the logic unit to logically combine the control signals at its first input and second input into a control signal for the switch, wherein the automatic power gating power domain comprises an asynchronous power switch control unit coupled to the switch, the asynchronous power switch control unit configured to generate the distributed switch control signal based on a control signal in the integrated circuit.

2. The integrated circuit of claim 1, wherein the automatic power gating power domain further comprises:
    a retention flip flop coupled to an internal signal line, the retention flip flop configured to store a value on the internal signal line when the asynchronous power switch control unit asserts a specified value on a retention control signal; and
    an isolation retention flip flop coupled to an external signal line exiting the automatic power gating power domain, the isolation retention flip flop configured to store a value on the external signal line when the asynchronous power switch control unit asserts the specified value on the retention control signal.

3. The integrated circuit of claim 1, wherein the automatic power gating power domain further comprises:

a flip flop coupled to an internal signal line, the flip flop configured to store a value on the internal signal line; and an isolation level shifting flip flop coupled to an external signal line exiting the automatic power gating power domain, the isolation level shifting flip flop configured to store a value on the external signal line.

4. An integrated circuit comprising:

a hard macro unit configured to provide a function, the hard macro unit comprising a power domain; and a top level power domain unit configured to provide fine grained functionality, the top level power domain unit comprising,     an automatic power gating power domain, the automatic power gating power domain containing circuit cells to provide a single function or a number of functions,     a switch having a first terminal coupled to a first power rail and a second terminal coupled to the automatic power gating power domain, the switch to control a current path through the automatic power gating power domain, and     a logic unit having an output coupled to a control terminal of the switch and a first input coupled to a common switch control signal line and a second input to a distributed control signal line unique to the logic unit, the logic unit to logically combine the control signals at its first input and second input into a control signal for the switch, wherein the top level power domain unit comprises two automatic power gating power domains, switches, and logic units, wherein the second input of the first logic unit and the second input of the second logic unit are coupled in parallel to the distributed control signal line, and wherein the integrated circuit further comprises a combiner coupled to the control terminal of each distributed switch, the combiner configured to produce a control signal related to the distributed switch states.

5. An integrated circuit comprising:

a hard macro unit configured to provide a function, the hard macro unit comprising a power domain; and a top level power domain unit configured to provide fine grained functionality, the top level power domain unit comprising,     an automatic power gating power domain, the automatic power gating power domain containing circuit cells to provide a single function or a number of functions,     a switch having a first terminal coupled to a first power rail and a second terminal coupled to the automatic power gating power domain, the switch to control a current path through the automatic power gating power domain, and     a logic unit having an output coupled to a control terminal of the switch and a first input coupled to a common switch control signal line and a second input to a distributed control signal line unique to the logic unit, the logic unit to logically combine the control signals at its first input and second input into a control signal for the switch, wherein a footprint of the automatic power gating power domain is limited to having square corners.

6. An integrated circuit comprising:

a hard macro unit configured to provide a function, the hard macro unit comprising a power domain; and a top level power domain unit configured to provide fine grained functionality, the top level power domain unit comprising,     an automatic power gating power domain, the automatic power gating power domain containing circuit cells to provide a single function or a number of functions,     a switch having a first terminal coupled to a first power rail and a second terminal coupled to the automatic power gating power domain, the switch to control a current path through the automatic power gating power domain, and     a logic unit having an output coupled to a control terminal of the switch and a first input coupled to a common switch control signal line and a second input to a distributed control signal line unique to the logic unit, the logic unit to logically combine the control signals at its first input and second input into a control signal for the switch, wherein each automatic power gating power domain has a power grid formed by severing conductors between individual automatic power gating power domains.

\* \* \* \* \*